United States Patent [19]

Sato et al.

[11] Patent Number: 5,852,656
[45] Date of Patent: Dec. 22, 1998

[54] ELECTRONIC CONFERENCE SYSTEM AND CONFERENCE SERVER APPARATUS

[75] Inventors: Kazuaki Sato; Koji Yamato, both of Kawasaki, Japan

[73] Assignee: Fujitsu Limited, Kanagawa, Japan

[21] Appl. No.: 496,527

[22] Filed: Jun. 29, 1995

[30] Foreign Application Priority Data

Sep. 2, 1994 [JP] Japan .................................. 6-209858

[51] Int. Cl.⁶ .................................................. H04M 11/00
[52] U.S. Cl. ........................ 379/93.21; 379/202; 370/260
[58] Field of Search ............................. 379/96, 93, 202, 379/203, 204, 205, 93.17, 93.21, 93.23; 348/15, 14

[56] References Cited

U.S. PATENT DOCUMENTS

| | | | |
|---|---|---|---|
| 5,323,445 | 6/1994 | Nakatsuka | 379/202 |
| 5,369,694 | 11/1994 | Bales et al. | 379/96 |
| 5,408,518 | 4/1995 | Yunoki | 379/202 |
| 5,440,624 | 8/1995 | Schoof, II | 379/202 |
| 5,483,587 | 1/1996 | Hogan et al. | 379/202 |
| 5,483,588 | 1/1996 | Eaton et al. | 379/202 |
| 5,625,407 | 4/1997 | Biggs et al. | 379/202 |
| 5,642,156 | 6/1997 | Saiki | 379/202 |

*Primary Examiner*—Stella Woo
*Attorney, Agent, or Firm*—Helfgott & Karas, P.C.

[57] ABSTRACT

When requests to attend a conference or requests to withdraw from a conference are issued from user terminals or voice input/output units, network equipment refers to connection addresses of these user terminals or voice input/output terminals to obtain user identification information (names, posts, etc.) from a table and communicates this user identification information to a conference server. The conference server collects conference-attendee information and conference-withdrawee information based upon the communicated user identification information. Further, a list of planned attendees at the conference is entered into the conference server via network equipment before the conference convenes, and the conference server compares the planned attendees and actual attendees at the conference and creates a list of conference absentees.

11 Claims, 16 Drawing Sheets

PLANNED ATTENDEE LIST

ATTENDEE LIST

MINUTES RECORD

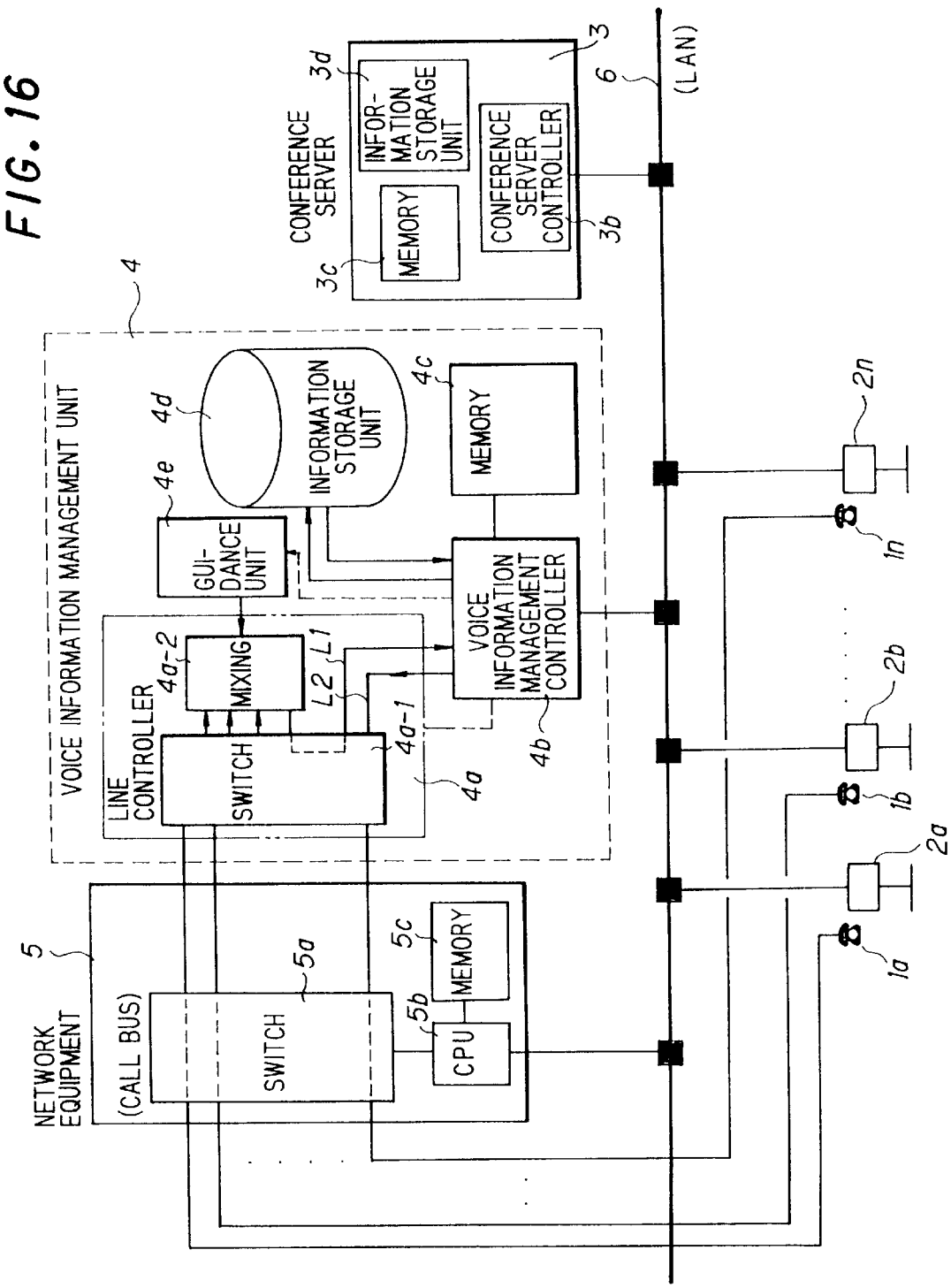

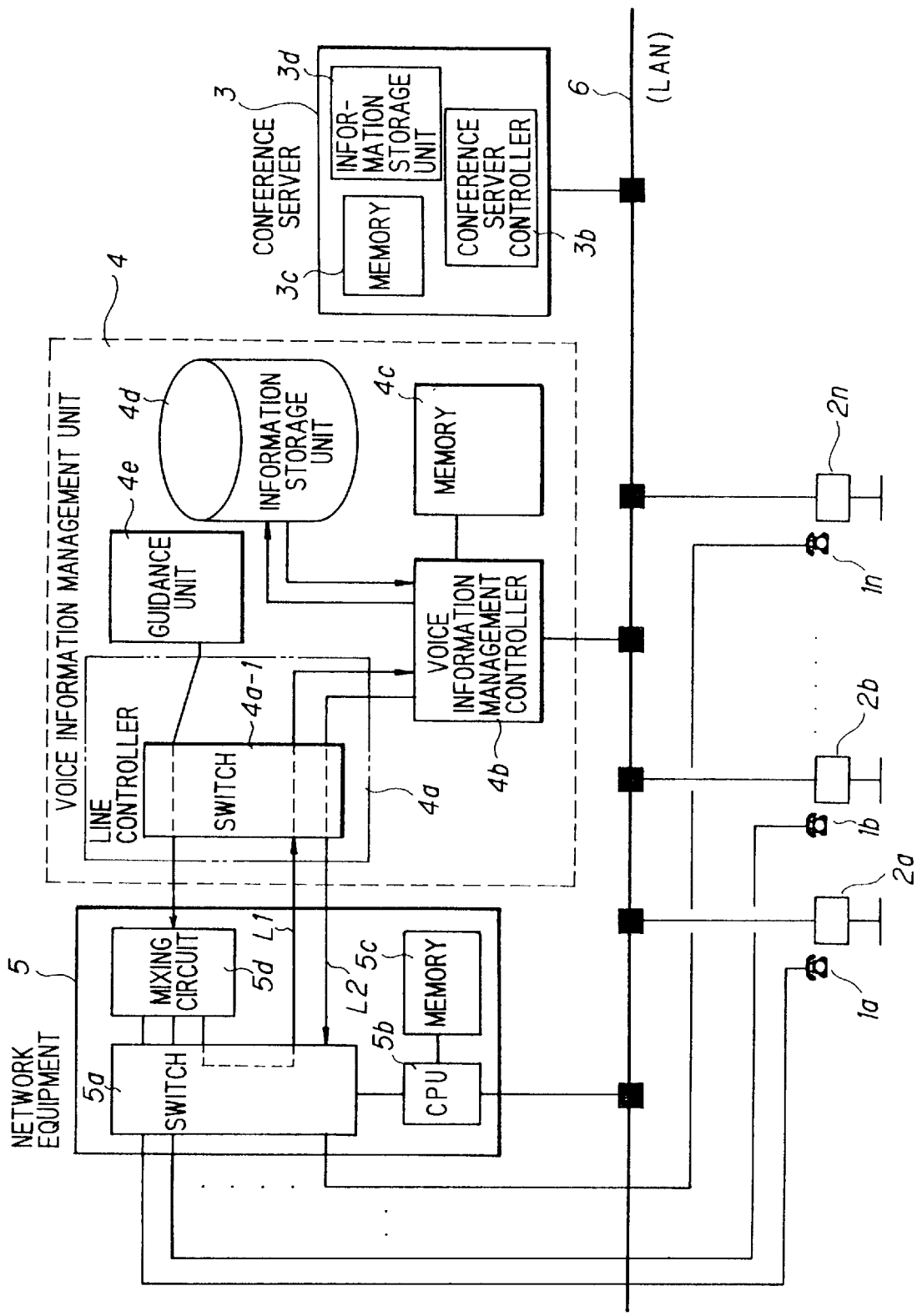

ELECTRONIC CONFERENCE SYSTEM AND CONFERENCE SERVER APPARATUS

BACKGROUND OF THE INVENTION

This invention relates to an electronic conference system and conference server apparatus. More particularly, the invention relates to an electronic conference system and conference server apparatus for automatically ascertaining the absence or presence of individuals planning to attend an electronic conference and, moreover, for readily ascertaining the business transacted at the conference.

An electronic conference system provided in recent years includes a combination of network equipment for conversation and communication of information, document servers or voice mail equipment which support conferences, and display terminals for displaying electronic documents. Such an electronic conference system does not require a special conference room because conferences are held by linking desktop electronic terminals (personal computers or the like) and telephones used as voice terminals in an office. One can participate in an electronic conference even while remaining at home. For these reasons, this is a field having a promising future.

Conventional electronic conference systems include those which employ electronic mail and those which rely upon a TV conference. Such an electronic conference system places prime importance upon prearranging the conference and issuing a general calling of participants and does not provide a conference support service based upon the linking of voices and documents (electronic documents) as the conference proceeds. In addition, the conventional electronic conference system is such that managing the attendance of attendees at a conference is based upon indications from the attendees per se (i.e., notifications of attendance from the attendees).

Thus, conventional electronic conference systems do not provide sufficient service and lack convenience. Accordingly, there is demand for a service through which the management of attendees can be performed automatically and for a conference support service based upon the linking of voices and documents, namely the linking of voice input/output units and document input/output units.

SUMMARY OF THE INVENTION

An object of the present invention is to make it possible to automatically manage attendance/withdrawal/absence of planned attendees at an electronic conference based upon the results of a connection between the terminals (display terminals, telephones, etc.) participating in the conference and network equipment, thereby dispensing with an operation by which the attendee per se registers his or her attendance when the conference convenes.

Another object of the present invention is to make it possible even for late attendees, attendees who withdraw from the conference during the proceedings and absentees to readily ascertain the business transacted at the conference.

A further object of the present invention is to provide a basic-data collecting service for creating statistical information appropriate for raising conference efficiency, a support service for facilitating the conference and a support service for promoting smooth attendance at the conference.

According to the present invention, the foregoing objects are attained by so arranging it that when requests to attend a conference or requests to withdraw from a conference are issued from user terminals or voice input/output units, network equipment obtains user identification information (names and posts) corresponding to these user terminals or voice input/output units, communicates this information to a conference server and collects conference-attendee information and conference-withdrawee information based upon the communicated user identification information.

According to the present invention, the foregoing objects are attained by entering a list of planned attendees at a conference into a conference server from a prescribed user terminal before the conference convenes, and having the conference server compare the list of planned attendees and actual attendees at the conference and create a list of conference absentees.

According to the present invention, the foregoing objects are attained by entering a list of planned attendees at a conference into a conference server from a prescribed user terminal before the conference convenes, having the conference server communicate the list of planned attendees to network equipment a fixed period of time before a time at which the conference convenes, and having the network equipment automatically call voice input/output units of the planned attendees and send audio requesting attendance at the conference.

According to the present invention, the foregoing objects are attained by entering a list of planned attendees at a conference into a conference server from a prescribed user terminal before the conference convenes, having the conference server compare the list of planned attendees and actual attendees at the conference upon elapse of a fixed period of time following convening of the conference to determine whether there are attendees not yet present and, if there are attendees not yet present, communicating a list of these attendees not yet present to network equipment and having the network equipment automatically call voice input/output units of the attendees not yet present and send audio requesting attendance at the conference.

According to the present invention, the foregoing objects are attained by having a conference server create and store conference proceedings, which have been entered from a user terminal, as an electronic document, transmit the conference proceedings to a prescribed user terminal via network equipment when there is a request for perusal of the conference proceedings from the prescribed user terminal, and display the conference proceedings on a display unit of the user terminal.

According to the present invention, the foregoing objects are attained by having a conference server use attendee summary information to calculate an aggregate of total attendee hours as well as percentage of attendance or percentage of absence after a conference is concluded.

Other features and advantages of the present invention will be apparent from the following description taken in conjunction with the accompanying drawings.

BRIEF DESCRIPTION OF THE DRAWINGS

FIGS. 6A–6D are diagrams for describing the content of a memory in a conference server, in which FIG. 6A is a diagram for describing a list of planned attendees at a conference, FIG. 6B a diagram for describing a list of attendees at the conference, FIG. 6C a diagram for describing the minutes of a conference and FIG. 6D a diagram for describing a user box provided for each participant at a conference;

FIG. 16 is a block diagram showing the construction of a second embodiment according to the present invention; and FIG. 17 is a block diagram showing the construction of a third embodiment according to the present invention.

DESCRIPTION OF THE PREFERRED EMBODIMENTS

(A) Overview of the Invention

Figure 1:
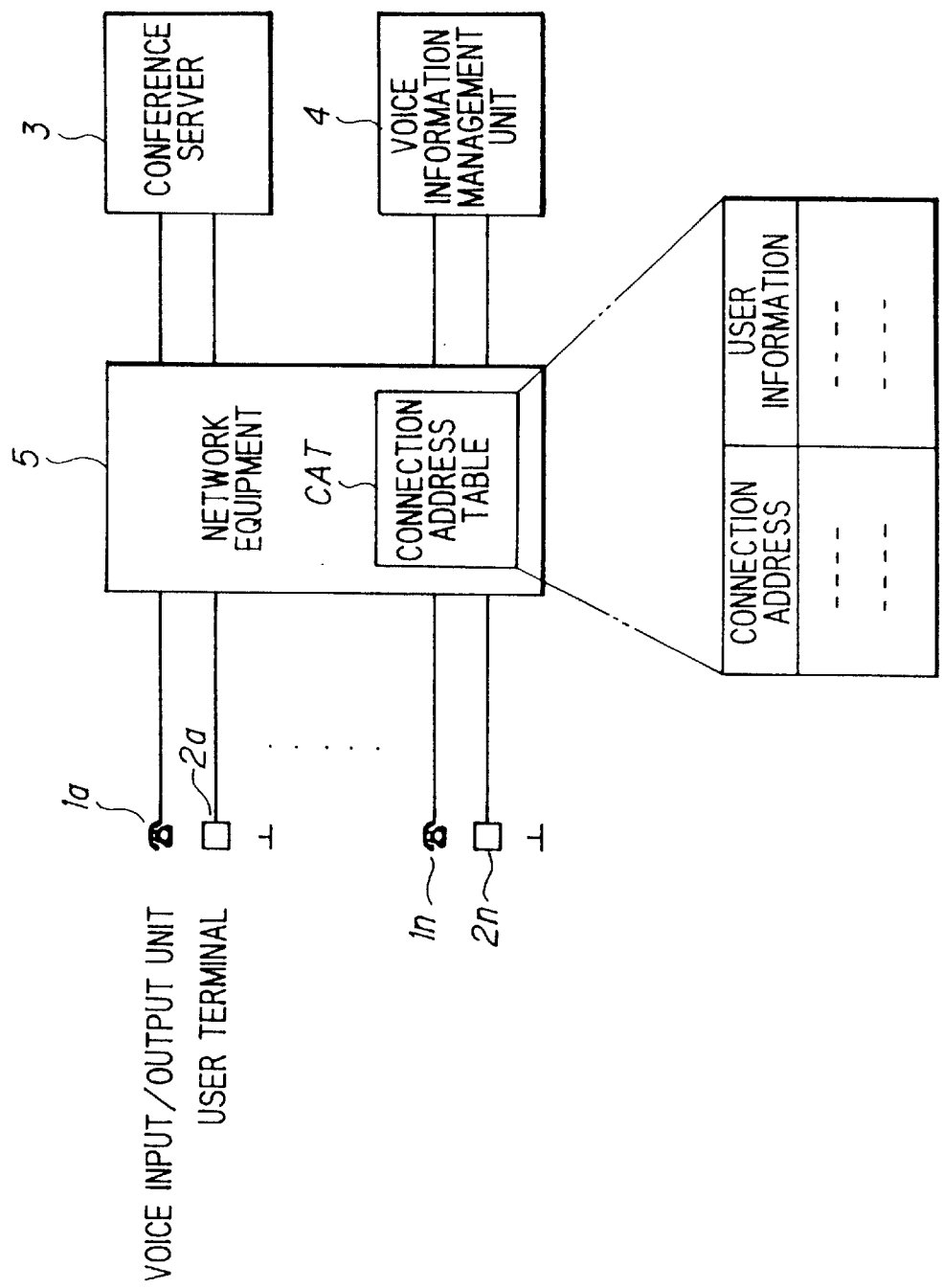
FIG. 1 is a diagram for describing the principles of the present invention.

FIG. 1 is a diagram for describing an overview of the present invention.

Illustrated in FIG. 1 are a plurality of voice input/output units 1a~1n such as telephones, and a plurality of user terminals 2a~2n such as personal computers for entering/displaying electronic document information and transmitting/receiving electronic documents. These units and terminals are of the type placed upon the desktop of a user. A conference server 3 accumulates the electronic documents received from a plurality of users, selects an electronic document, which has been designated by a user terminal, from the group of accumulated electronic documents and transmits the selected electronic document to the user terminal. A voice information management unit 4 accumulates voice information received from the plurality of voice input/output units, selects prescribed voice information, which is designated by a user terminal, from the accumulated voice information and transmits the selected voice information to a voice input/output unit. Network equipment 5 is connected to the plurality of voice input/output units, the plurality of user terminals, the conference server and the voice information management unit and is equipped with a connection address table CAT, which stores user identification information (names, posts, etc.) in correspondence with each of the voice input/output units 1a~1n and user terminals 2a~2n.

When there are requests for participation in or withdrawal from a conference from the user terminals 2a~2n or voice input/output units 1a~1n, the network equipment 5 refers to connection addresses of the user terminals or voice input/output units to obtain user identification information from the table CAT and communicate this information to the conference server 3. The latter collects attendance/withdrawal information regarding conference attendees based upon the communicated user identification information. In this case, the conference server 3 automatically inserts the attendance/withdrawal information regarding attendees into an attendee summary field of a minutes format. Further, a prescribed user terminal (the user terminal of the chairperson) enters a list of planned attendees into the conference server 3 via the network equipment 5 before the conference convenes, and the conference server 3 compares the planned attendees with the attendees, creates a list of absentees and automatically inserts the absentee list into the attendee summary field of the minutes format. Furthermore, when there is a request for participation in or withdrawal from a conference from a user terminal or voice input/output unit, the network equipment 5 communicates conference participation time and conference withdrawal time to the conference server 3 together with the user identification information, and the conference server 3 inserts these times into the attendee summary field of the minutes format.

If this arrangement is adopted, a participant need only perform a connect/disconnect operation in order to participate in or withdraw from a conference. In response to such an operation, the conference server manages attendance/withdrawal/absence of planned attendees at an electronic conference automatically, thereby making it possible to dispense with an attendance registration operation by each the attendee per se when the conference convenes.

Further, a prescribed user terminal (the user terminal of the chairperson) enters a list of planned attendees into the conference server 3 before the conference convenes, and the conference server 3 communicates the list of planned attendees to the network equipment 5 a fixed period of time before the time at which the conference is due to convene. The network equipment 5 automatically calls the voice input/output units of the planned attendees. After a voice input/output unit answers, the network equipment 5 connects the voice information management unit 4 to this voice input/output unit, and the voice information management unit 4 sends the voice input/output unit a voice message requesting attendance at the conference.

Further, a prescribed user terminal (the user terminal of the chairperson) enters a list of planned attendees into the conference server 3 before the conference convenes, and the conference server 3 compares the list of planned attendees and actual attendees at the conference upon elapse of a fixed period of time following convening of the conference to determine whether there are attendees not yet present. If there are attendees not yet present, the conference server communicates a list of these attendees not yet present to the network equipment 5. After a voice input/output unit answers, the network equipment 5 connects the voice information management unit 4 to this voice input/output unit, and the voice information management unit 4 sends the voice input/output unit a voice message requesting attendance at the conference.

If this arrangement is adopted, a support service for promoting smooth attendance at a conference can be provided.

Further, the conference server 3 uses attendee summary information to calculate an aggregate of total attendee hours as well as percentage of attendance or percentage of absence after a conference is concluded. If this arrangement is adopted, it is possible to provide a basic-data collecting service for creating statistical information appropriate for raising conference efficiency.

Furthermore, the server 3 creates conference proceedings, which have been entered from a user terminal, as an electronic document, transmits the conference proceedings to a prescribed user terminal via the network equipment 5 when there is a request for perusal of the conference proceedings from the prescribed user terminal during the conference, and displays the conference proceedings on a display unit of the user terminal. Further, the voice information management unit 4 accumulates the voice of a user entered from each voice input/output unit during a conference. When a request for reproduction of the conference voice information is received from a prescribed user terminal or voice input/output unit, the voice information management unit 4 transmits the conference voice information to a designated voice input/output unit via the network equipment 5. After conclusion of the conference, the server 3 saves the minutes of the conference in a memory device, transmits the minutes to a user terminal via the network equipment 5 in response to a request from the user terminal and displays the minutes on the display unit of the user terminal. Further, after conclusion of the conference, the voice information management unit 4 saves the conference voice information. When a request for reproduction of the conference voice information is received from a prescribed user terminal or voice input/output unit, the voice information management unit 4 transmits the conference voice information to a designated voice input/output unit via the network equipment 5.

If this arrangement is adopted, it is possible even for late attendees, attendees who withdraw from the conference during the proceedings and absentees to readily ascertain the business transacted at the conference.

Further, a prescribed user terminal enters the time at which a conference is due to end into the server 3 before the conference convenes. The conference server monitors the time remaining for the conference and, when the remaining time reaches a prescribed time, connects the voice information management unit 4 to the voice input/output units of all attendees via the network equipment 5. The voice information management unit 4 sends all of the voice input/output units a voice message to give notification of the remaining conference time. If this arrangement is adopted, it is possible to provide a support service that facilitates electronic conferences.

Figure 2:
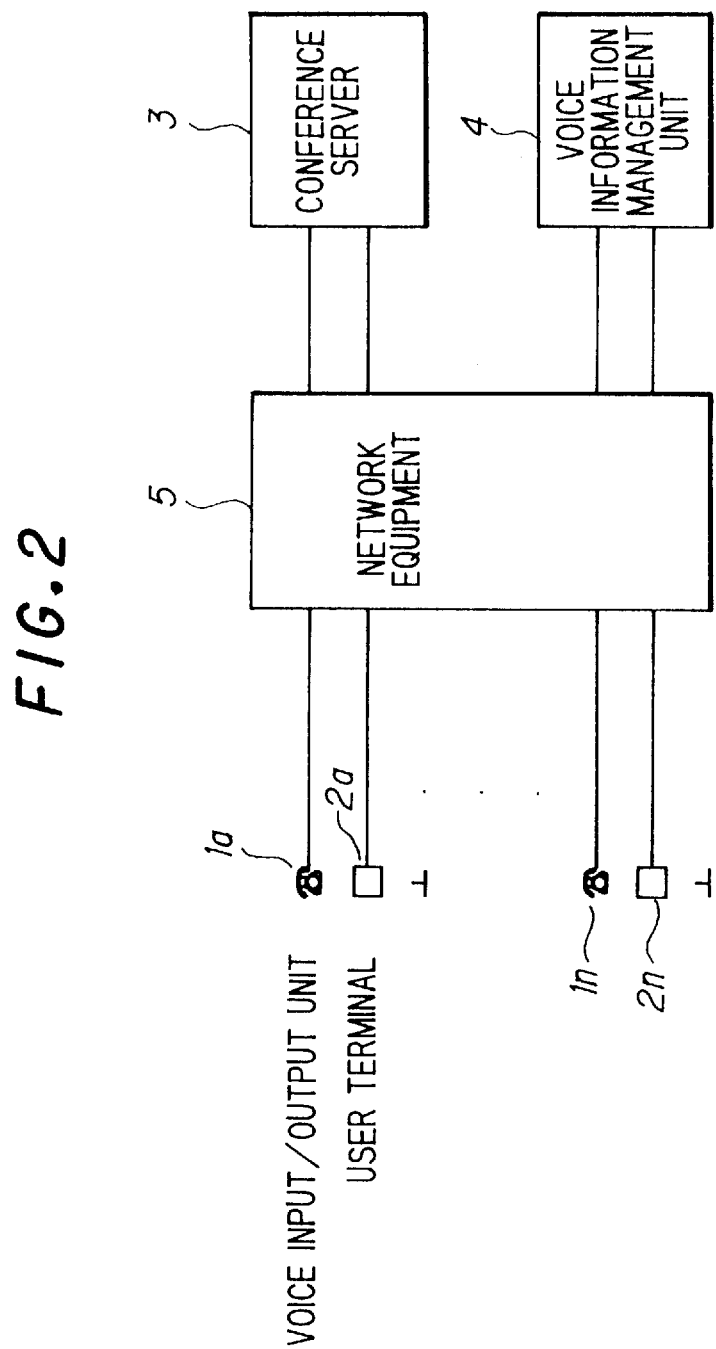
FIG. 2 is a diagram showing the overall configuration of an electronic conference system according to the present invention.

(B) First Embodiment of the Invention
(a) Configuration
(a-1) Overall configuration FIG. 2 is a diagram showing the overall configuration of an electronic conference system according to the present invention. The system includes the voice input/output units 1a~1n such as telephones, and the user terminals 2a~2n such as personal computers for entering/displaying electronic document information and transmitting/receiving electronic documents. These units and terminals are of the type placed upon the desktop of a user. The system further includes the conference server 3 which functions to accumulate documents, which have been received from user terminals participating in a conference, and create the minutes (an electronic document) of the conference; to select an electronic document, which has been designated by a user terminal, from the group of accumulated electronic documents and transmit the selected electronic document to the user terminal in response to a request; and to manage the attendees at the conference. The system further includes the voice information management unit 4 for accumulating voices (conference voice information) received from each of the voice input/output units participating in the conference, selecting prescribed voice information, which is designated by a user terminal, from the accumulated voice information and transmitting the selected video information. The system further includes the network equipment 5 connected to the plurality of telephones 1a~1n, the plurality of user terminals 2a~2n, the conference server 3 and the voice information management unit 4. The network equipment 5 has a switch function for connecting and disconnecting these items of equipment in response to a request, and a function for storing user identification information (names, posts, etc.) in correspondence with connection addresses of the telephones 1a~1n and user terminals 2a~2n, retrieving the user identification information from the connection addresses and outputting this information.

(a-2) Network equipment

Figure 3:
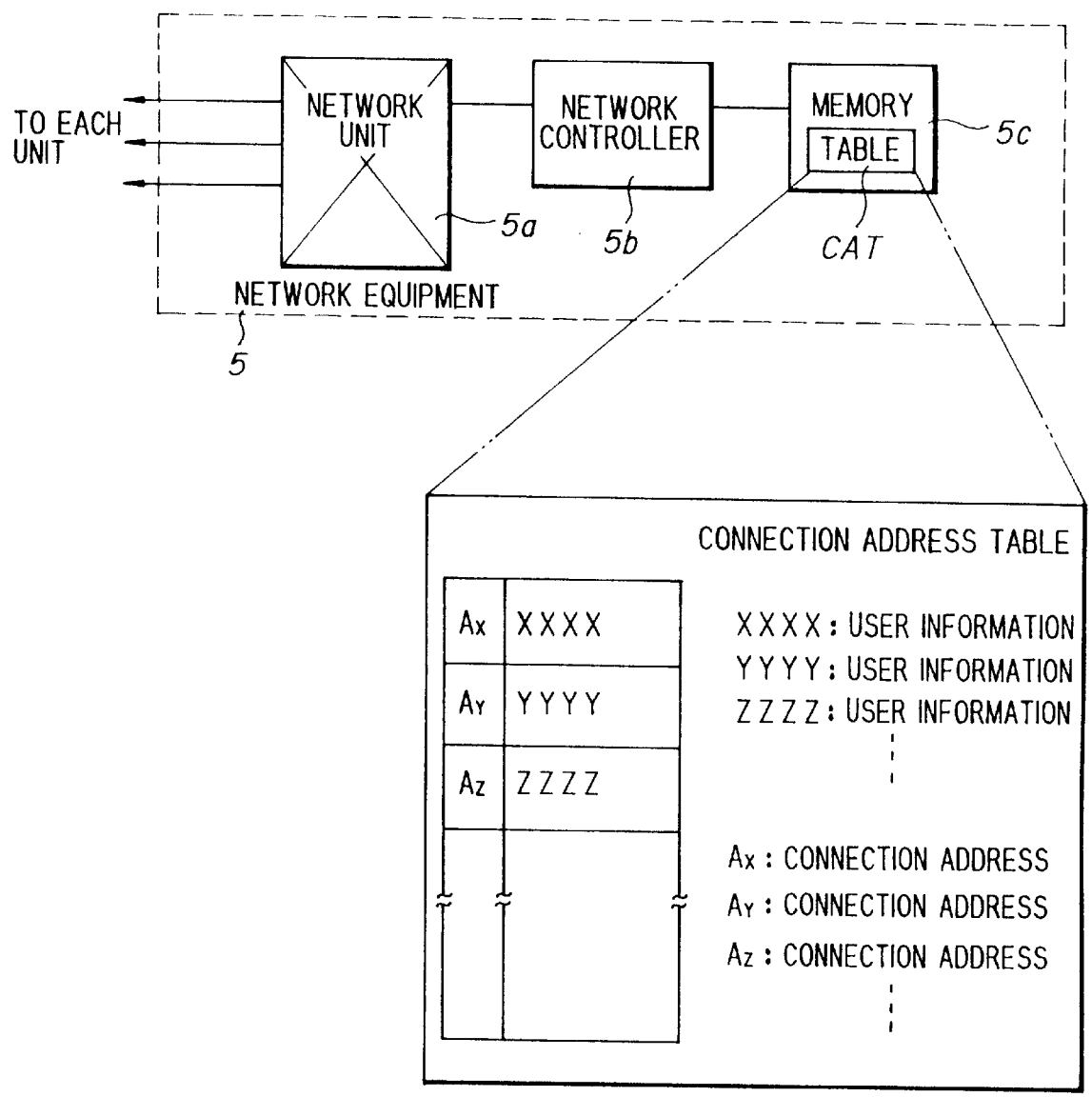
FIG. 3 is a diagram showing the construction of network equipment.

As shown in FIG. 3, the network equipment 5 is equipped with a switch unit (network unit) 5a for connecting and disconnecting each of the items of equipment, a processor (network controller) 5b for exercising overall control of the network equipment 5, and a main memory 5c. The latter is provided with the connection address table CAT, which stores user identification information (names, posts, etc.) in correspondence with the connection addresses of the telephones 1a~1n and user terminals 2a~2n.

(a-3) Conference server

Figure 4:
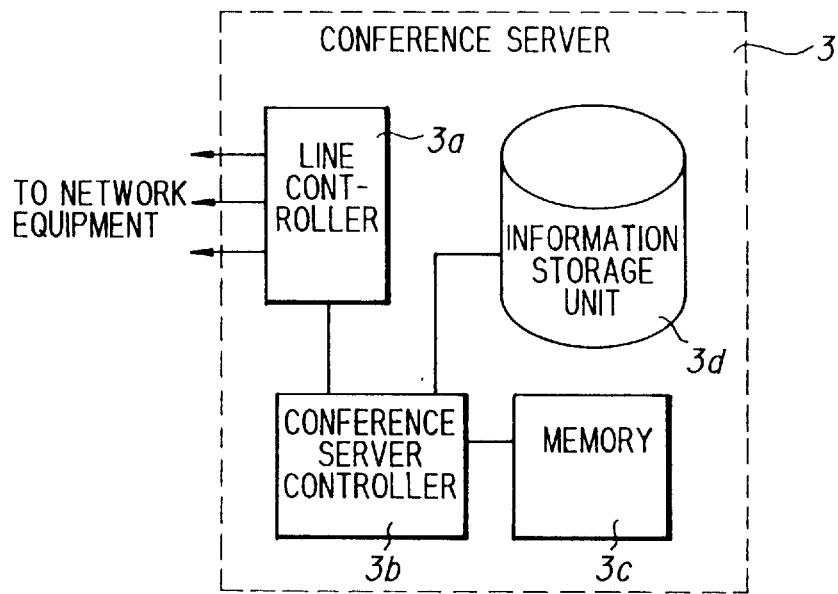
FIG. 4 is a block diagram showing the construction of a conference server.

As shown in FIG. 4, the conference server 3 includes a line controller 3a, a processor (conference-server controller) 3b which executes various functions such as creation of minutes, management of attendees and requested selection/transmission of the minutes, a memory 3c and an information storage unit 3d such as a hard disk or optical disk for storing electronic documents such as the minutes of a conference.

Figure 6A:
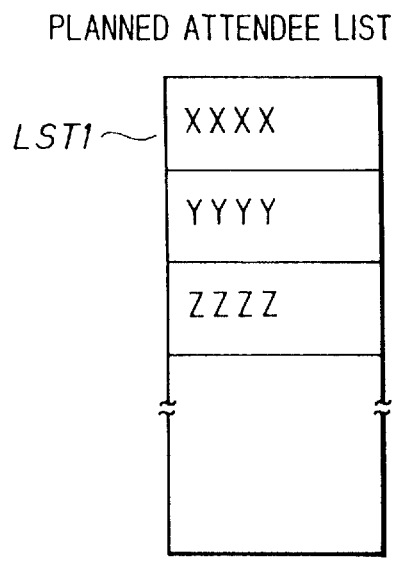
Figure 6B:
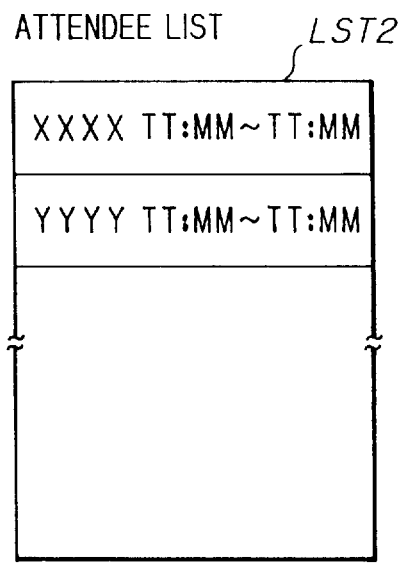
Figure 6C:
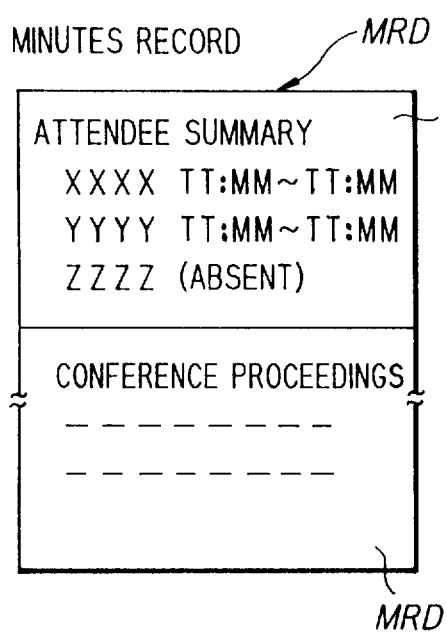
Figure 6D:
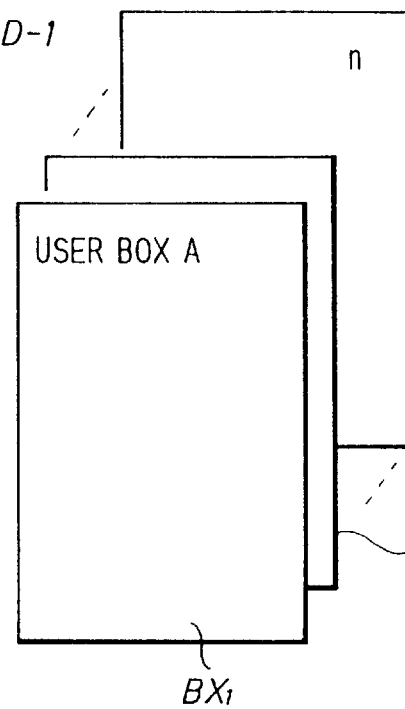

As shown in FIGS. 6A–6D, a list LST1 (FIG. 6A) of planned attendees at a conference, a list LST2 (FIG. 6B) of attendees at the conference and a minutes record MRD (FIG. 6C) are stored in the memory 3c. Further, user boxes BX1~BXn are provided in the memory 3c for each of the conference participants, as shown in FIG. 6D, and are used to record prescribed information.

Information such as the planned attendees at a conference, the items on the agenda of the conference, the date the conference is to be convened, the length of time of the conference and the sponsor (the chairperson) is sent by the chairperson from a user termination to the conference server 3 via the network equipment 5 before the conference is convened. Accordingly, the conference-server controller 3b receives these items of information, creates the planned attendee list LST1 and stores the list in the memory 3c. Further, the conference-server controller 3b manages the names and the attendance times and/or withdrawal times of the conference participants and creates the attendee list LST2. Furthermore, the conference-server controller 3b records documents, which have been entered from the user terminals, in the memory 3c and creates the minutes record MRD. The minutes record MRD has a prescribed minutes format, which is provided with an attendee summary MRD-1 and an electronic-document record field MRD-2. The names and the attendance times and/or withdrawal times of attendees and the names of absentees are recorded in the attendee summary MRD-1, and the conference proceedings (minutes) are recorded in the electronic-document record field MRD-2.

(a-4) Voice information management unit

Figure 5:
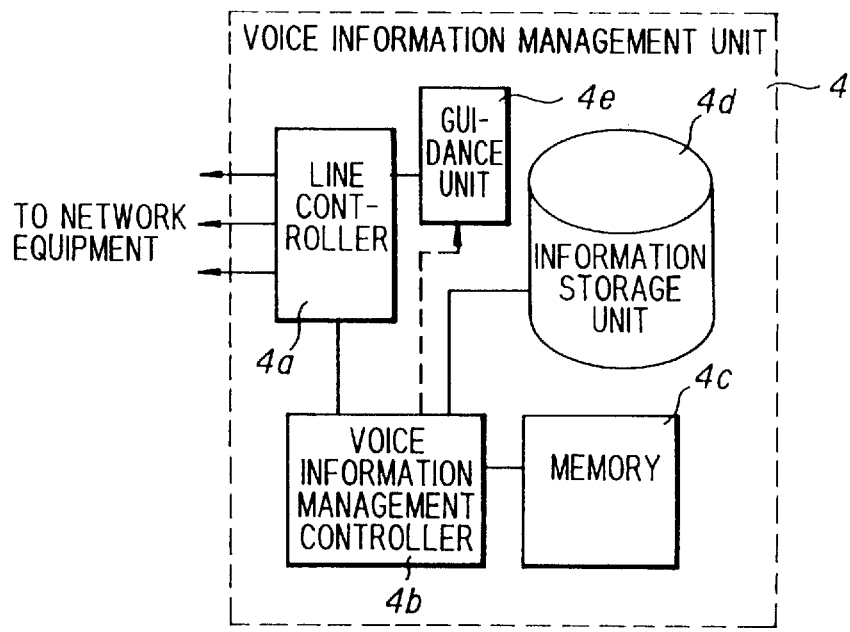
FIG. 5 is a block diagram showing the construction of a voice-information management unit.

As shown in FIG. 5, the voice information management unit 4 is equipped with a line controller 4a, a voice information management controller 4b, a working memory 4c, an information storage unit 4d for recording conference audio, and a guidance unit 4e for playing a prescribed voice track for guidance. The voice information management controller 4b converts conference audio into a digital data compresses the digital data and stores it in the information storage unit 4d. Further, the voice information management controller 4b reads out prescribed audio information that has been requested, decompresses the information to the original audio, converts the audio into an analog signal and outputs the signal.

The information storage unit 4d performs writing and reading operations concurrently and may be a storage device that makes joint use of a buffer memory and disk, or a disk device equipped with a plurality of independently controllable heads.

Figure 7:
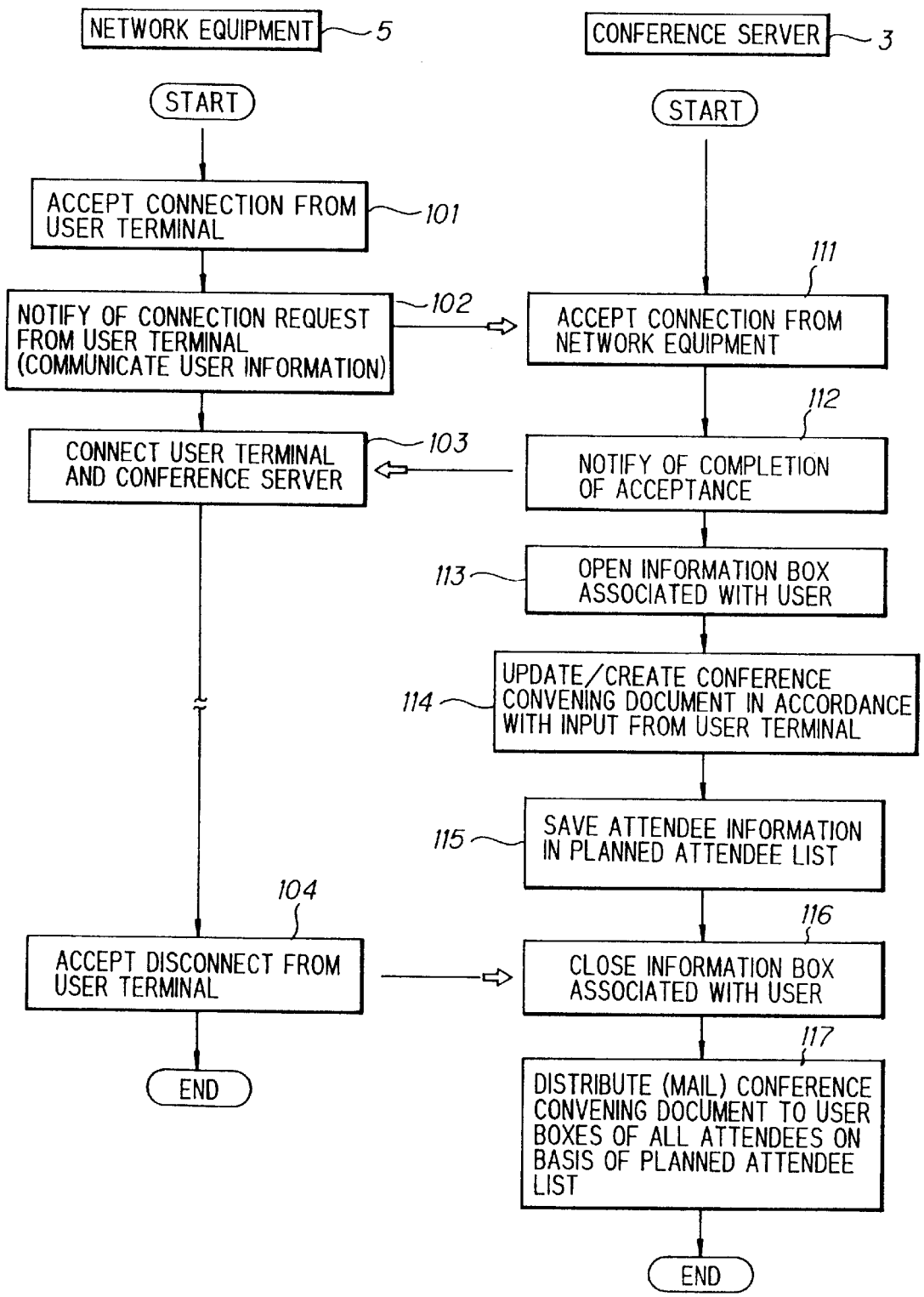
FIG. 7 is a diagram for describing a procedure through which a notice indicating convening of a conference is created.
Figure 8:
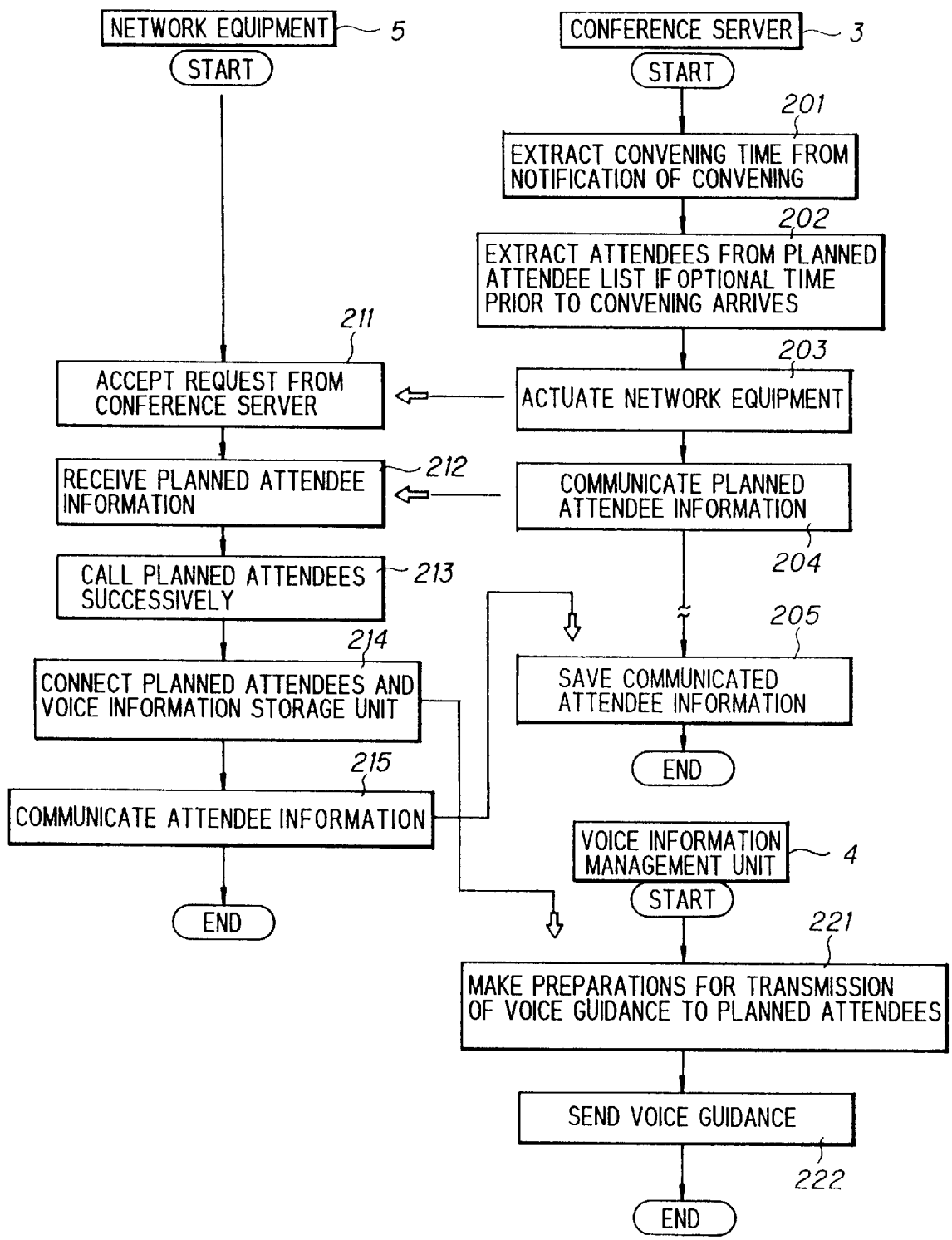
FIG. 8 is a diagram for describing a procedure for issuing calls before a conference is convened.

(b) Operation of electronic conference system (b-1) Creation of conference convening notice Before a conference is convened, the chairperson creates a notice indicating the convening of the conference and distributes the notice to planned participants at the conference. FIG. 7 is a diagram for describing a procedure through which a notice indicating convening of a conference is created.

The chairperson starts up his or her own user terminal (e.g., user terminal 2a) and commands the network controller 5b, via the network unit 5a, to create the notice that the conference will convene (step 101). Upon receiving the command, the network controller 5b notifies the conference server 3, via the network unit 5a, of the fact that the conference convening notice is to be created and that the chairperson's user terminal 2a and conference server 3 are to be connected (step 102). On the basis of the connection request received via the line controller 3a, the conference-server controller 3b of the conference server 3 makes acceptance preparations directed to creation of the notice indicating the convening of the conference (step 111) and notifies the network equipment 5, via the line controller 3a, of completion of acceptance of the connection request (step 112).

On the basis of notification of acceptance management received via the network unit 5a, the network controller 5b of the network equipment 5 drives the network unit 5a to connect the chairperson's user terminal 2a and the conference server 3 (step 103). Further, upon notification of completion of acceptance, the server controller 3b establishes an information box (user box), which is associated with the user (the chairperson in this case), in the memory 3c (step 113).

The chairperson thenceforth enters such information as the planned attendees, the items on the agenda of the conference, the date the conference is to be convened, the length of time of the conference and the sponsor (the chairperson) from the user terminal 2a and transfers this information to the conference server 3. The conference server controller 3b receives this information, updates the variable portion of a standardized conference convening document to create the final conference convening document and stores the document in the user box (step 114). Next, the conference server controller 3 saves the planned attendee information in the planned attendee list LST1 (step 115).

If the chairperson has entered all of the information necessary for creating the conference convening notice, an operation for ending the transmission is performed. The network controller 5b of the network equipment 5 accepts a signal (a disconnect signal) indicative of this operation and so informs the conference server 3, after which the network controller 5b disconnects the user terminal 2a and the conference server 3 (step 104).

In response to being informed of disconnection, the conference server controller 3b of the conference server 3 closes the information box associated with the user (the chairperson) (step 116). Then, on the basis of the planned attendee list, the conference server controller 3b distributes the conference convening document to the user boxes of all planned attendees by electronic mail (step 117).

(b-2) Call prior to convening of conference

The conference server controller 3b extracts the date of convening from the conference convening document and performs monitoring to determine whether a prescribed time prior to the convening time has arrived (step 201). If the prescribed time prior to the convening time has arrived, the conference server controller extracts the planned attendees from the planned attendee list LST1 (step 202) and starts up the network equipment 5 to communicate the planned attendee information (steps 203, 204).

The network controller 5b of the network equipment accepts a request from the conference server 3 (step 211) and then receives the planned attendee information sent from the conference server (step 212). Thereafter, the network equipment 5 obtains the telephone numbers of the planned attendees and automatically calls the telephones of the planned attendees based upon these telephone numbers (step 213). When a telephone responds, the network equipment 5 connects the telephone and the voice information management unit 4 and requests the voice information management controller 4b to transmit voice guidance (step 214). If a called telephone does not respond within a prescribed period of time, the telephone of the next planned attendee is called.

The voice information management controller 4b responds to the above-mentioned request by making preparations for transmission of voice guidance (step 221). More specifically, the voice information management controller 4b controls the line controller 4a to connect the voice guidance unit 4e and the telephone and then actuates the voice guidance unit 4e. Thereafter, the guidance (announcing) unit 4e sends voice guidance to the telephone to request attendance at the conference (step 222).

If the network equipment 5 has completed calling all planned attendees by repeating the operation described above, information representing the planned attendees to which the voice guidance was communicated is sent to the conference server 3 (step 215). The latter saves the information representing the planned attendees to which the voice guidance was communicated and then terminates the processing for issuing calls prior to the convening of the conference.

(b-3) Preparations made by the chairperson for convening a conference

Figure 9:
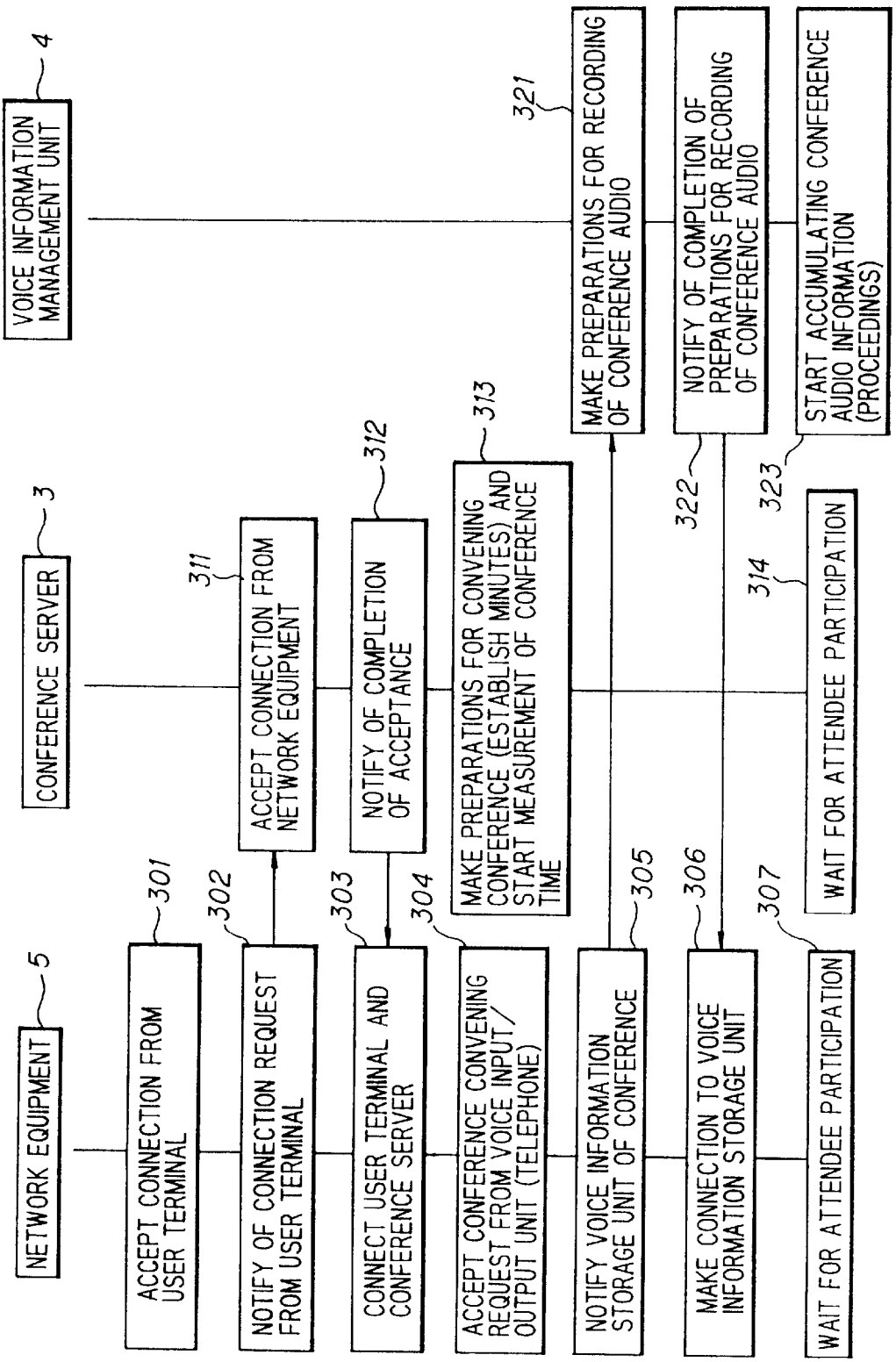
FIG. 9 is a diagram for describing a procedure through which a chairperson prepares to convene a conference.

When a prescribed time prior to the convening of the conference (five minutes before the conference, for example) arrives, the chairperson makes preparations for convening the conference. FIG. 9 is a diagram for describing a procedure through which a chairperson prepares to convene a conference.

The chairperson starts up his or her own user terminal (user terminal 2a, for example) and commands the network controller 5b, via the network unit 5a, to convene the conference (step 301). Upon receiving the command, the network controller 5b notifies the conference server 3, via the network unit 5a, of the fact that a conference is to be convened and that the chairperson's user terminal 2a and conference server 3 are to be connected (step 302). On the basis of the connection request received via the line controller 3a, the conference-server controller 3b of the conference server 3 makes acceptance preparations directed to convening of the conference (step 311) and notifies the network equipment 5, via the line controller 3a, of completion of acceptance of the connection request (step 312).

On the basis of notification of acceptance, the network controller 5b drives the network unit 5a to connect the chairperson's user terminal 2a and the conference server 3 (step 303).

Next, the chairperson actuates his or her own telephone (telephone 1a, for example) and, by entering a special number, sends a conference convening request to the network controller 5b via the network unit 5a (step 304). Upon receiving the request, the network controller 5b notifies the voice information management unit 4, via the network unit 5a, of the fact that the telephone 1a of the chairperson and the voice information management unit 4 are to be connected (step 305).

The voice information management controller 4b of the voice information management unit 4 performs acceptance processing on the basis of the connection request received via the line controller 4a (step 321) and informs the network equipment 5, via the line controller 4a, of completion of acceptance of the connection request (step 322).

On the basis of notification of completion of acceptance from the voice information management unit 4, the network controller 5b drives the network unit 5a to connect the telephone 1a of the chairperson and the voice information management unit 4 and also makes preparations for multiple connections appropriate for a voice conference (step 306). The network controller 5b then waits for participation of the next attendee (step 307). In concurrence with this processing, the conference server 3 (1) establishes minutes indicating the convening of the conference, (2) starts measuring elapsed time of the conference and (3) records information relating to the chairperson in the attendee list LST2 (step 313). The conference server 3 then waits for participation of the planned attendees (step 314). Further, in concurrence with the conference server processing, the voice information management controller 4b applies a command to the information storage unit 4d so as to enable storage of voice information received from the line controller 4a connected to the network equipment 5. The controller 4b then starts storage of the voice information received from the line controller 4a (step 323). Thus, by virtue of the operation performed by the chairperson to prepare for the convening of the conference, the conference server 3 and voice information management unit 4 are placed in a state in which the conference may be convened at any time.

(b-4) Participation of planned attendees at conference

When the chairperson completes the preparations for convening a conference, the planned attendees participate in the conference through the procedure set forth below. There are two methods through which planned attendees may participate in a conference. One is for the chairperson to call the planned attendees successively or all at one time, and the other is for the planned attendees to participate in the conference voluntarily. Here the latter case will be described, namely a case in which the planned attendees participate in the conference on their own volition.

Figure 10:
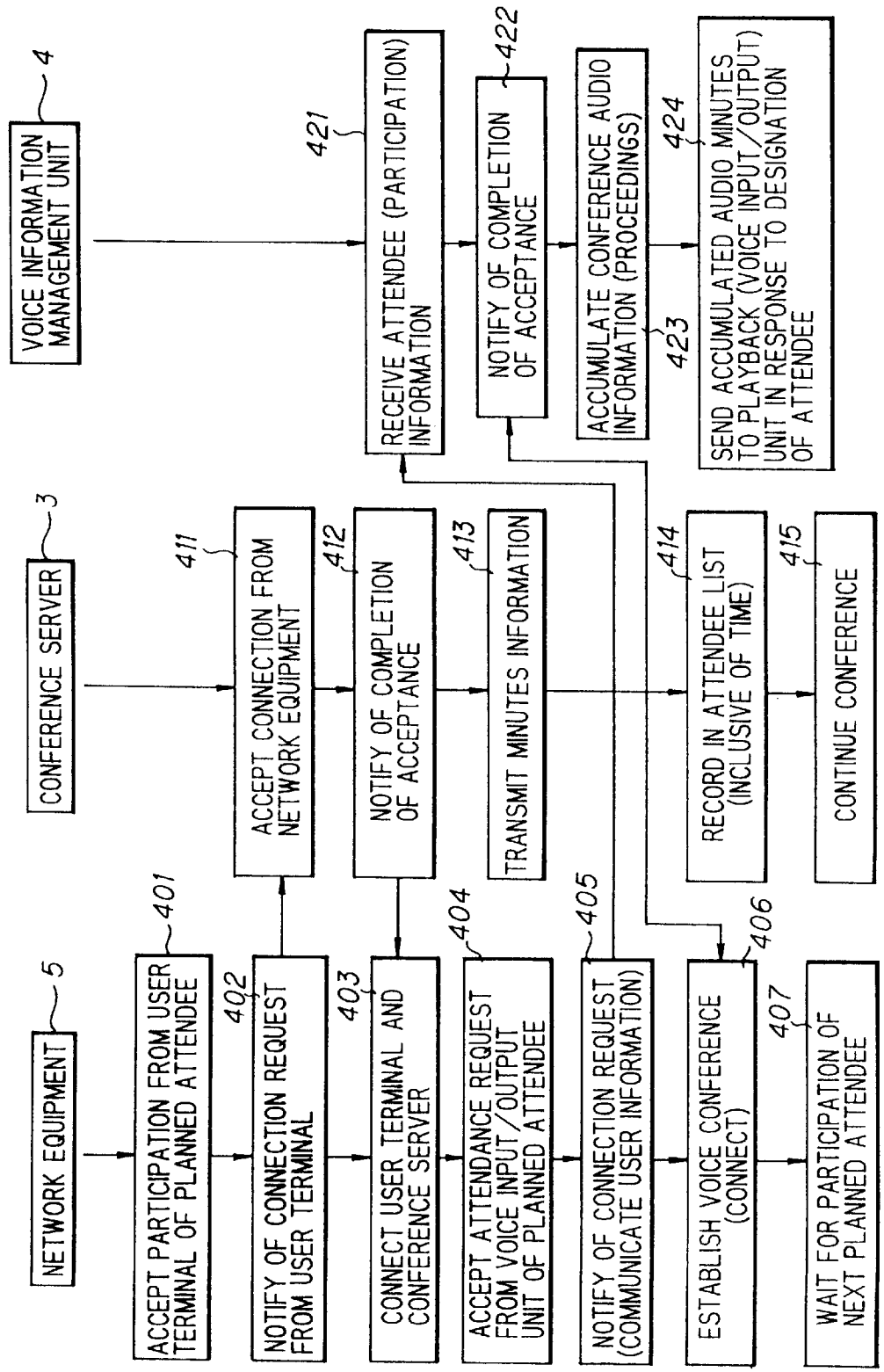
FIG. 10 is a diagram for describing a procedure through which an attendee participates in a conference.

FIG. 10 is a diagram for describing a procedure through which attendees participate in a conference.

An attendee actuates his or her own user terminal (user terminal 2b, for example) and indicates to the network controller 5b, via the network unit 5a, of participation in the conference (step 401). Upon receiving this indication, the network controller 5b notifies the conference server 3, via the network unit 5a, of the fact that participation is intended and that the attendee's user terminal 2b and conference server 3 are to be connected. In this case, the network controller 5b obtains user information (name, post, etc.) from the table CAT on the basis of the connection address of the user terminal and sends this user information to the conference server 3 together with the above-mentioned notification (step 402).

On the basis of the connection request received via the line controller 3a, the conference-server controller 3b makes acceptance preparations directed to attendance at the conference (step 411) and notifies the network equipment 5, via the line controller 3a, of completion of acceptance of the connection request (step 412).

Next, the attendee actuates his or her own telephone (telephone 1b, for example) and, by entering a special number, sends a conference attendance request to the network controller 5b via the network unit 5a (step 404). Upon receiving the request, the network controller 5b notifies the voice information management unit 4, via the network unit 5a, of the fact that the telephone 1b of the attendee and the voice information management unit 4 are to be connected. In this case, the network controller 5b obtains user information (name, post, etc.) from the table CAT on the basis of the connection address (telephone number) of the telephone and sends this user information to the voice information management unit 4 together with the above-mentioned notification (step 405).

The voice information management controller 4b of the voice information management unit 4 performs acceptance processing on the basis of the connection request received via the line controller 4a (step 421) and informs the network equipment 5, via the line controller 4a, of completion of acceptance of the connection request (step 422). On the basis of notification of completion of acceptance from the voice information management unit 4, the network controller 5b drives the network unit 5a to connect the telephone 1b of the attendee and the voice information management unit 4 and also makes preparations for multiple connections appropriate for a voice conference (step 406). The network controller 5b then waits for participation of the next attendee (step 407).

In concurrence with this processing, the conference server controller 3b transmits the minutes record MRD established earlier by the chairperson as well as the elapsed time of the conference to the user terminal 2b of the attendee via the network equipment 5. As a result, it becomes possible to refer to the minutes record MRD and elapsed time of the conference from the user terminal 2b. In addition, it becomes possible for all attendees to write to the minutes record (step 413). Next, the conference server controller 3b records the attendee information and time of attendance in the planned attendee list LST2 (step 414), after which the controller waits for conference participation from the next planned attendee recorded in the planned attendee list LST2 (step 415).

In concurrence with the processing executed by the conference server controller 3b, the voice information management controller 4b stores voice information of the chairperson and voice information of the attendees, which has been received from the line controller 5a connected to the network equipment 5, in the information storage unit 4d (step 423). In addition, the voice information management controller 4b is capable of optionally reproducing and sending the stored voice information in response to a command from the chairperson and attendee. The controller 4b then waits for next attendee (step 424).

The controllers of the network equipment 5, conference server 3 and voice information management unit 4 repeat the above-described processing until the attendance of all planned attendees is completed.

(b-5) Call after convening of conference

Figure 11:
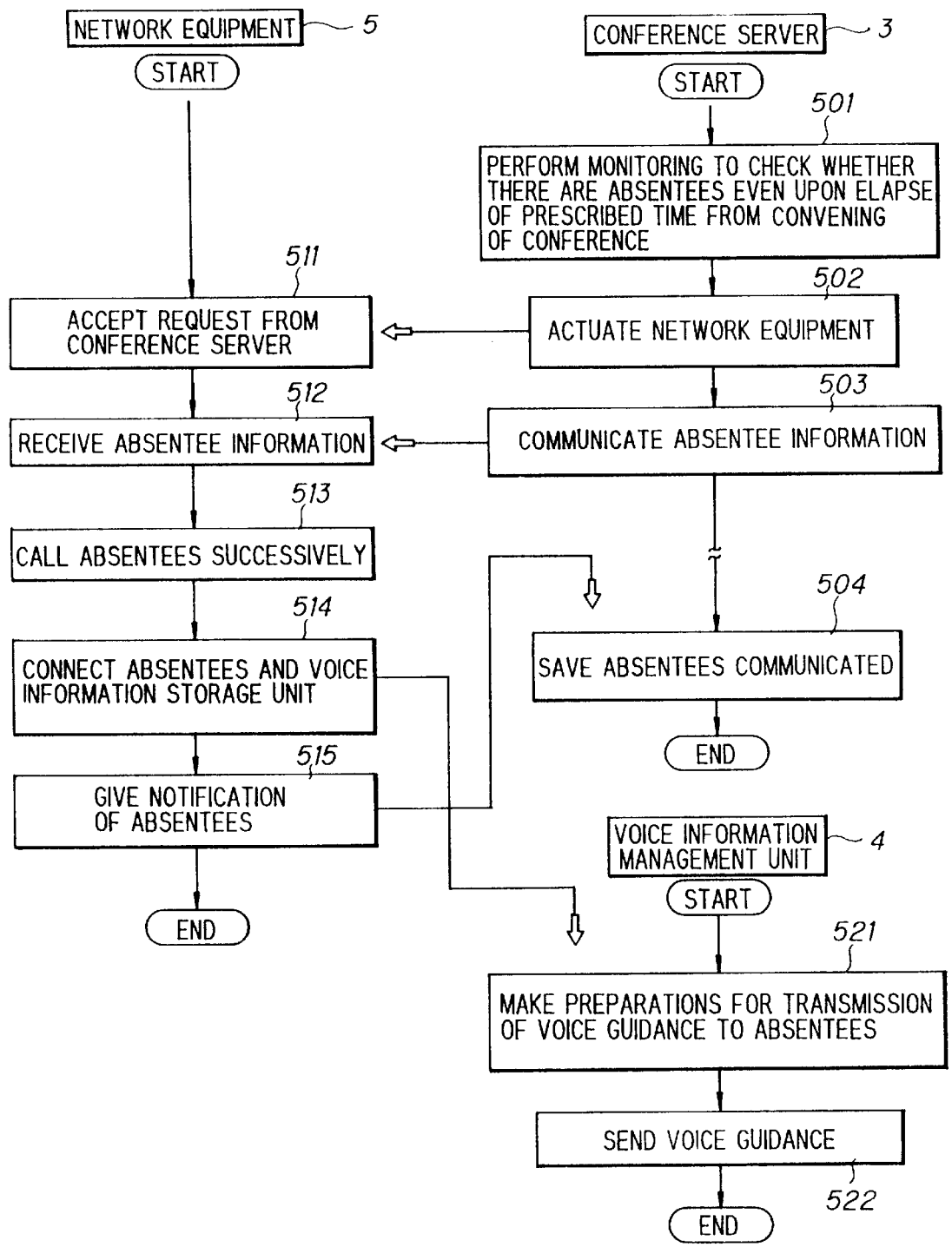
FIG. 11 is a diagram for describing a procedure for issuing calls after a conference has been convened.

The service of an electronic conference system can be improved if voice guidance prompting participation in a conference is sent to planned participants who have not attended the conference even upon elapse of the conference convening time. FIG. 11 is a diagram for describing a procedure for issuing calls after a conference has been convened.

The conference server controller 3b performs monitoring to determine whether a prescribed time has passed following elapse of the conference convening time. If the prescribed time has passed, then the conference server 3b determines whether there is a planned participant who is not participating in the conference (step 501). If there a planned participant not participating in the conference, the conference server controller 3b actuates the network equipment 5 and communicates information indicative of the absentee, namely the planned participant not participating in the conference (steps 502, 503).

Upon accepting the request from the conference server 3 (step 511), the network controller 5b of the network equipment receives the absentee information sent from the conference server (step 512). The network equipment 5 thenceforth obtains the telephone number of the absentee and automatically calls the telephone number of the absentee on the basis of this telephone number (step 513). If the telephone answers, the network equipment 5 connects this telephone to the voice information management unit 4 and requests the voice information management controller 4b to send voice guidance so that an absentee may call after a conference is convened (step 514). It should be noted that if a telephone does not answer within a prescribed period of time, the telephone of the next absentee is called.

In response to this request, the voice information management controller 4b makes preparations for sending voice guidance (step 521). More specifically, the voice information management controller 4b controls the line controller 4a to connect the voice guidance unit 4e and the telephone and actuates the voice guidance unit 4e. Thereafter, the guidance unit (announcing unit) 4e sends the telephone the voice guidance requesting participation at the conference (step 522).

When this operation is repeated and the network equipment 5 has completed calling all absentees, the network equipment 5 communicates, to the conference server 3, the information representing the absentees provided with the voice guidance (step 515). The conference server 3 saves the communicated absentee information and terminates the processing for the placing of calls after the convening of the conference (step 504).

(b-6) Withdrawal processing

Figure 12:
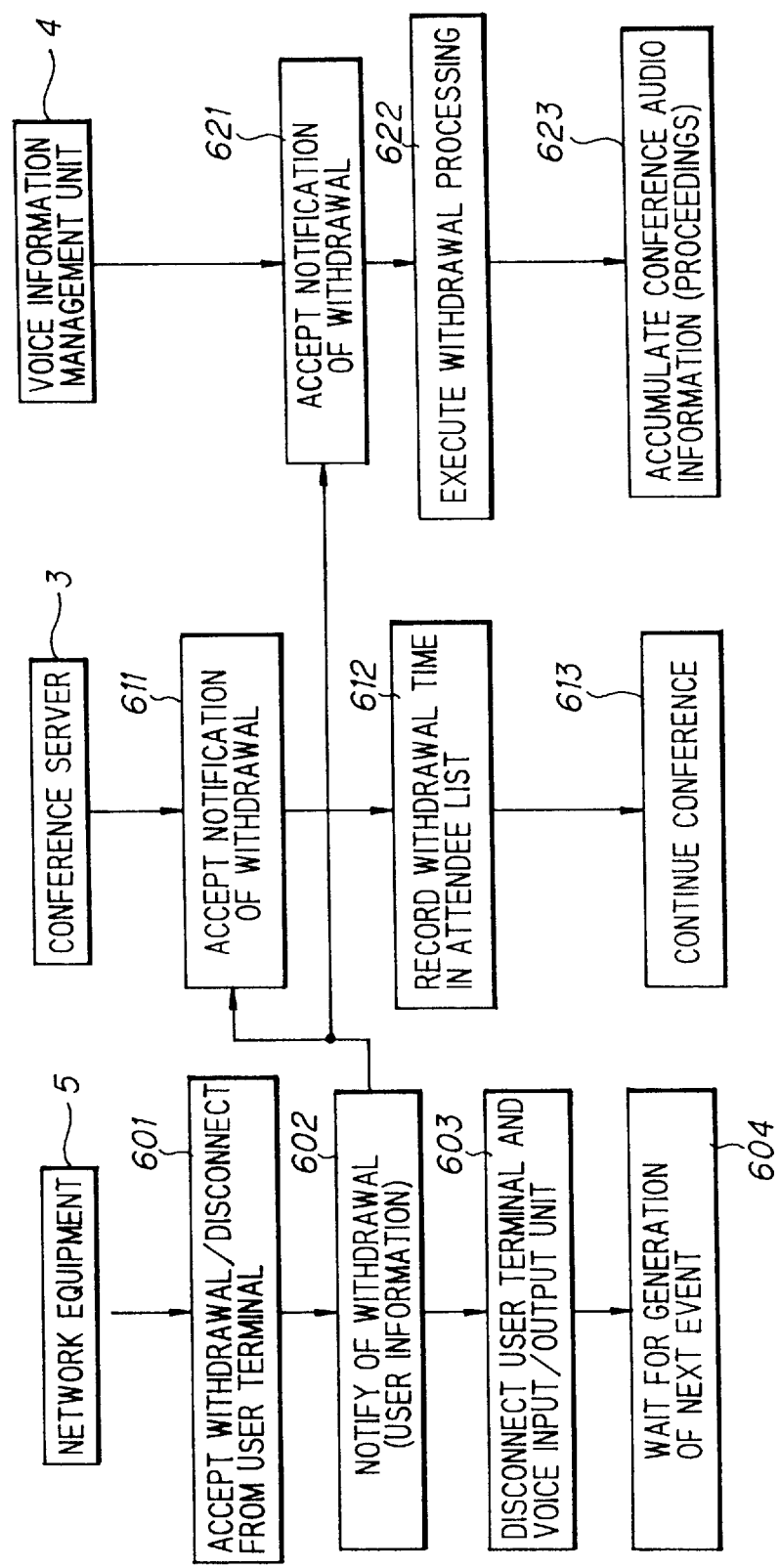
FIG. 12 is a diagram for describing a processing procedure for withdrawal from a conference.

In a case where a participant withdraws from a conference while the conference is in session, it is required that information of such a withdrawal be managed. FIG. 12 is a diagram for describing a processing procedure for withdrawal from a conference.

If a participant withdraws during the course of a conference, the participant indicates withdrawal using his or her user terminal or indicates withdrawal by hanging up the his or her telephone (step 601). Upon receiving this indication, the network controller 5b obtains the user information from the table CAT and transmits a withdrawal notice, which includes the user information, to the conference server 3 and voice information management unit 4 (step 602). Further, the network controller 5b controls the network unit 5a, disconnects the user terminal and telephone of the withdrawee (step 603) and waits for generation of the next event (step 604).

Upon receiving the withdrawal notice via the line controller 3a, the conference server controller 3b records the withdrawal time of the withdrawee in the attendee list LST (steps 611, 612) and continues the conference (step 613). Upon receiving the withdrawal notice via the line controller 4a, the voice information management controller 4b executes withdrawal processing (steps 621, 622) and continues the storing of conference voice information (step 623).

(b-7) Notification of time remaining for conference

Figure 13:
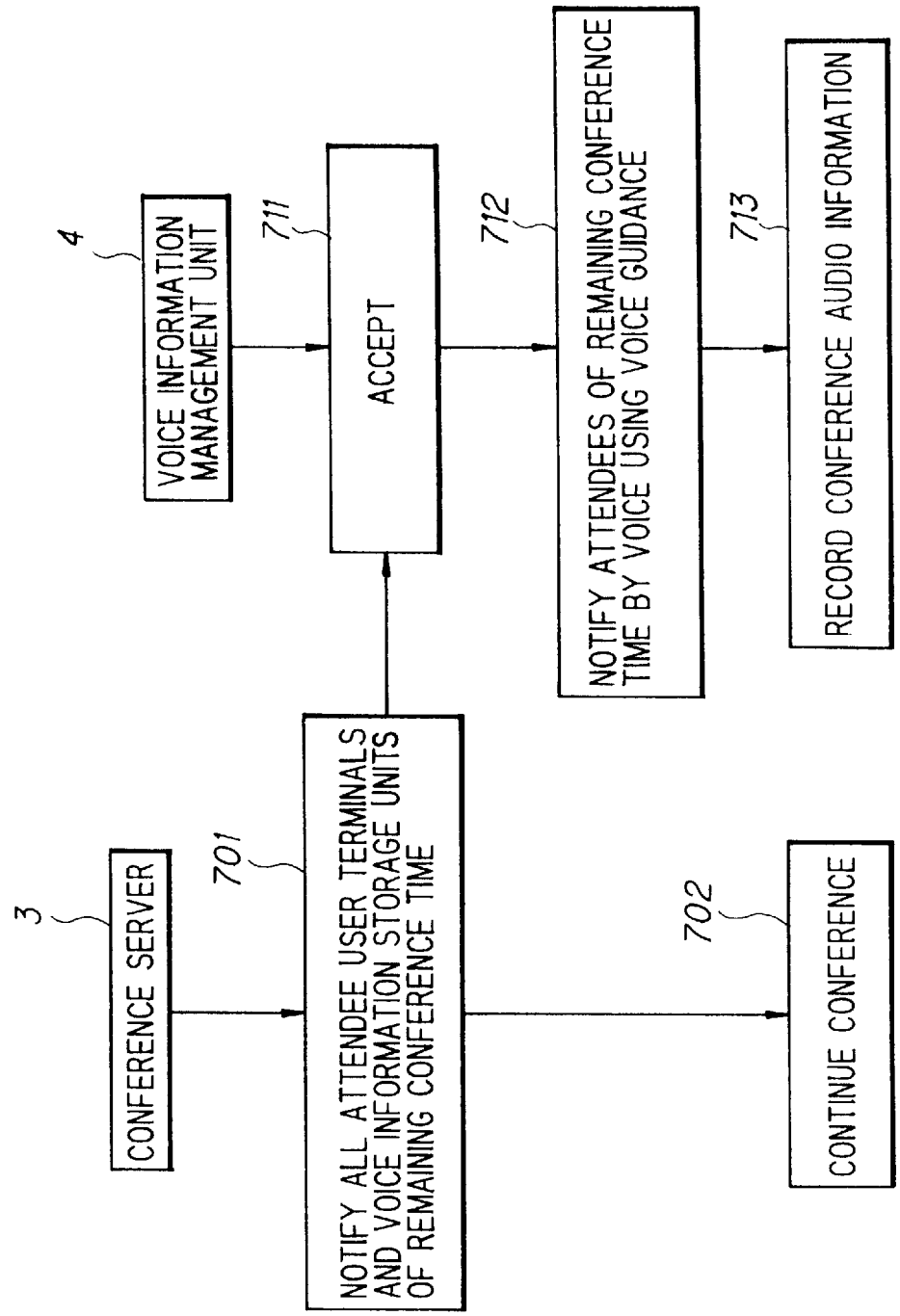
FIG. 13 is a diagram for describing a procedure through which notification of remaining time is given.

If the time remaining for a conference can be communicated to the conference attendees, a smooth conference can be held by suitably prompting the attendees. FIG. 13 is a diagram for describing a procedure through which notification of remaining time is given.

The conference server controller 3b of the conference server 3 measures the time that has passed since convening of the conference, successively transmits elapsed-time display information to the user terminals of all attendees and displays the information on all of these user terminals. In concurrence with this control, the conference server controller 3b compares the planned conference conclusion time and the current time and, when the remaining time attains a set time, requests that the voice information management controller 4b transmit an announcement of remaining time (step 701) and continues the conference (step 702).

Upon accepting the request for announcement of remaining time (step 711), the voice information management unit 4 controls the voice guidance unit 4e, notifies all attendees of the remaining time by voice (step 712) and then continues the recording to the conference audio information (step 713).

(b-8) Conclusion of conference

Figure 14:
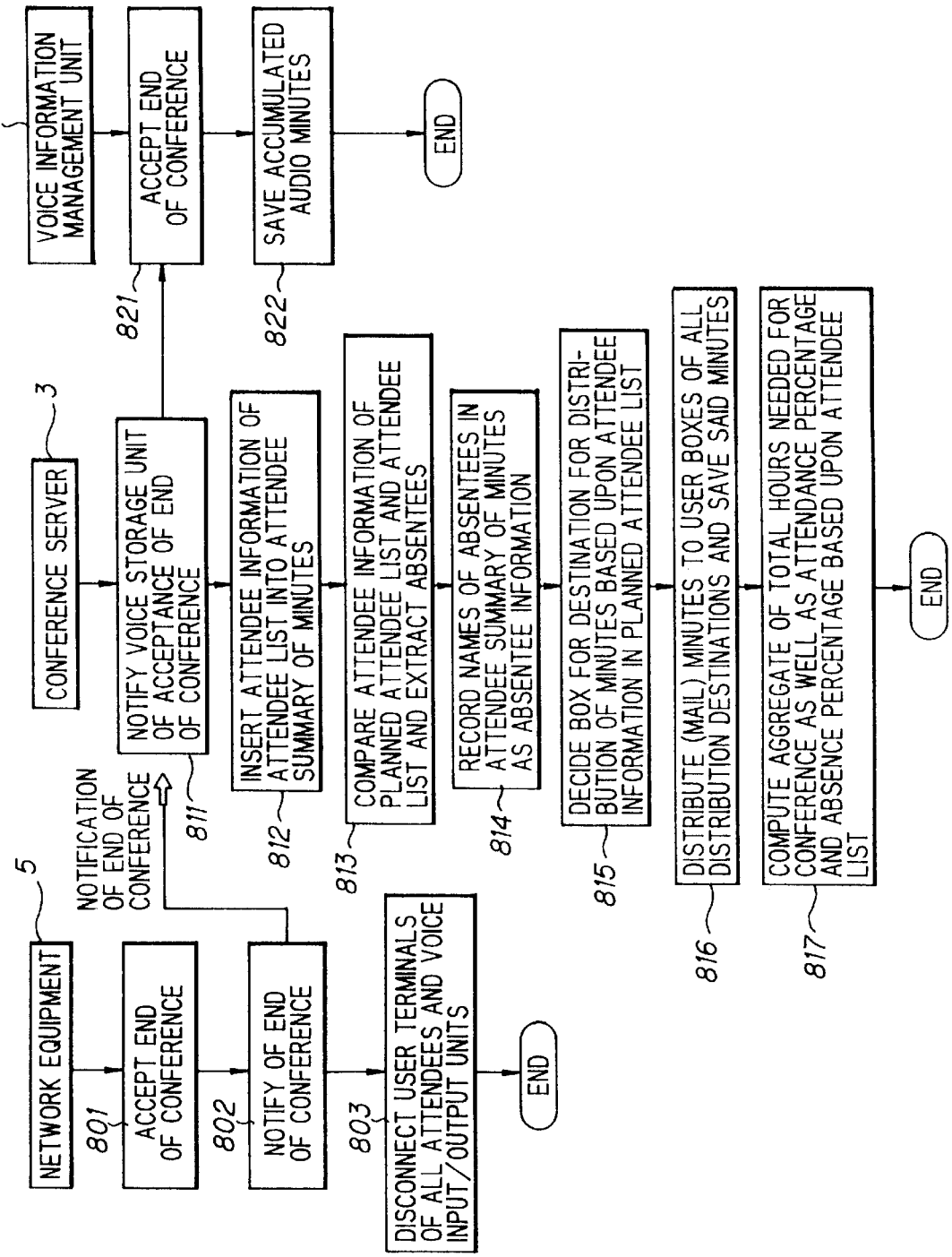
FIG. 14 is a diagram for describing a procedure through which a conference is concluded.

When the time for the conference to conclude arrives, the chairperson must terminate the conference. FIG. 14 is a diagram for describing a procedure through which a conference is concluded.

When the conference ends, the network controller 5b of the network equipment 5 responds to an indication from the chairperson by communicating information indicating conclusion of the conference to the conference server 3 and voice information management unit 4 via the network unit 5a (steps 801, 802). Next, the network controller 5b drives the network unit 5a to disconnect the user terminals of all attendees from the telephones (step 803) and terminates the processing for the electronic conference.

Upon receiving the information indicating completion of the conference from the network controller 5b, the conference server controller 3b so notifies the voice information management unit 4 (step 811) and inserts all of the attendee information in the attendee list LST2 into the attendee summary MRD-1 of the minutes record MRD (step 812).

Next, the conference server 3b compares the user information of the planned attendee list LST1 with that of the attendee list LST2, extracts the absentees and inserts the extracted absentee information in the attendee summary MRD-1 of the minutes record MRD (steps 813, 814). Thereafter, on the basis of the planned attendee information in the planned attendee list LST1, the conference server controller 3b establishes a box for destinations of distribution of the minutes in the memory 3c (step 815). Next, the controller 3b distributes, to the boxes of all users, the minutes record MRD that was contributed to by the chairperson and attendees during the conference, thereby making it possible for the minutes to be referred to from user terminals of users who did and did not attend the conference (step 816). Furthermore, the conference server controller 3b saves the minutes record in the information storage unit 3d as common information and completes the conference upon (1) calculating an aggregate of total attendee hours based upon the attendee list LST2 and (2) calculating an aggregate of attendance percentage and absence percentage on the basis of the attendee summary in the minutes (step 817).

Similarly, upon accepting the information of conference completion (step 821), the voice information management controller 4b executes completion processing, saves the voice information that was recorded during the conference in the information storage unit 4d (step 822) so that the information can be reproduced at will from telephones of users who did and did not attend the conference, and terminates processing for the conference.

Figure 15:
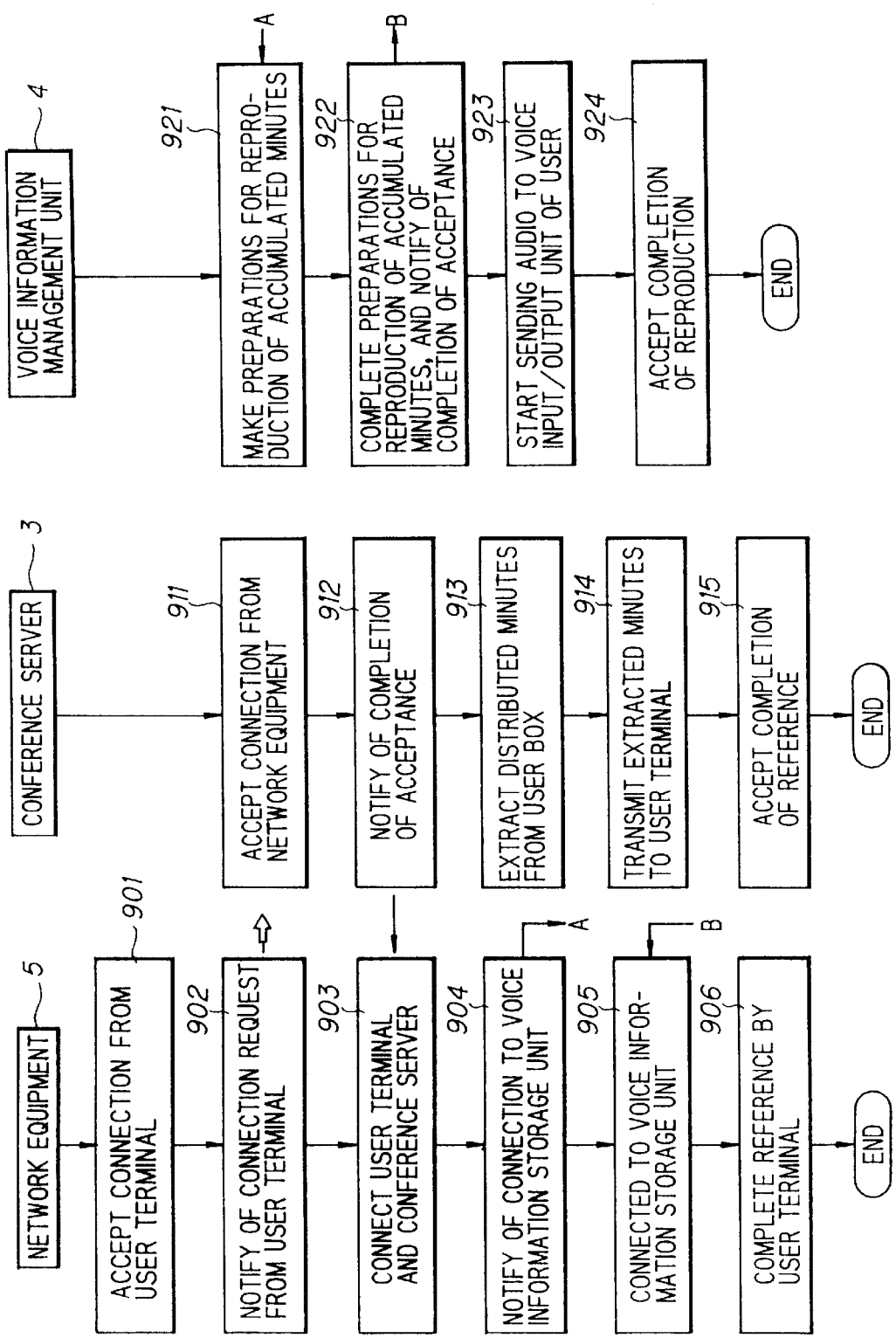
FIG. 15 is a diagram for describing a procedure through a user may refer to and/or reproduce the minutes of a conference after the conference.

(b-9) Reference to and reproduction of minutes by users after conclusion of conference There are cases in which conference attendees, absentees, latecomers and withdrawees wish to confirm the proceedings of a conference after the conference is over. FIG. 15 is a diagram for describing a procedure through which a user may refer to and/or reproduce the minutes of a conference after the conference.

A user such as a conference attendee, absentee, latecomer or withdrawee actuates his or her own user terminal, takes the telephone off the hook and sends the network controller 5b a minutes reference/reproduction request (step 901). Upon receiving the request, the network controller 5b notifies the conference server 3, via the network unit 5a, of the fact that the minutes and conference voice information are to be referred to and/or reproduced and that the user terminal is to be connected to the conference server 3 (step 902).

Upon receiving the connection request via the line controller 3a, the conference server controller 3b makes acceptance preparations for reference to the minutes (step 911) and notifies the network unit 5, via the line controller 3a, of completion of acceptance of the connection request (step 912). On the basis of notification of completion of acceptance from the conference server 3, the network controller 5b drives the network unit 5a to connect the user terminal to the conference server 3 (step 903).

Next, the network controller 5b notifies the voice information management controller 4b of the fact that the telephone conforming to the user terminal is to be connected to the voice information management unit 4 (step 904). On the basis of the connection request received via the line controller 4a, the voice information management controller 4b makes acceptance preparations directed to reproduction of the conference voice information (step 921) and notifies the network equipment 5, via the line controller 4a, of completion of acceptance of the connection request (step 922).

On the basis of the completion of acceptance of the connection request from the voice information management controller 4b, the network controller 5b drives the network unit 5a to connect the telephone to the voice information management unit 4 (step 905).

In concurrence with the foregoing, the conference server controller 3b extracts the minutes, which have already been distributed, from the user box corresponding to the user terminal that issued the reference request (step 913), transmits the extracted minutes to the user terminal via the network equipment 5 (step 914) and completes acceptance for the reference operation (step 915).

The voice information management controller 4b reads out the requested conference voice information, reproduces the information, sends it to the telephone (step 923) and completes acceptance for the reproduction operation (step 924).

In response to completion of reference acceptance by the conference server 3, the network controller 5b disconnects the user terminal from the conference server 3 and, in response to completion of reproduction acceptance by the voice information management unit 4, the network controller 5b disconnects the telephone and the voice information management unit 4 and terminates reference/reproduction processing (step 906).

The foregoing is the procedure for referring to the minutes and for reproducing the conference audio information after conclusion of the conference. However, it is also possible to refer to and/or reproduce, from a user terminal, current minutes and conference audio information in a conference that is presently in progress. If this arrangement is adopted, an attendee who arrives at a conference late can ascertain the current proceedings by skimming through the information. This makes it easier to participate in the conference. When a conference is in progress, the voice lines of all attendees are multiply connected by the network unit 5a so that the voices of all participants can be heard by heard from any telephone. However, in a case where a certain participant requests reproduction of conference audio information, the line of this participant is removed from the multiple connection and this line is connected to a reproduction output line of the voice information management unit 4.

(C) Second Embodiment of the Invention

In the first embodiment, the arrangement is such that all of the voice input/output units 1a~1n such as the telephones, the user terminals 2a~2n such as the personal computers, the conference server 3 and the voice information management unit 4 are connected to the network equipment 5, which is equipped with a switching function. However, it is possible to construct an electronic conference system in which joint use is made of network equipment such as a LAN and PBX (public branch exchange).

FIG. 16 is a block diagram showing the configuration of such an electronic conference system, in which components identical with those of the first embodiment are designated by like reference characters. The system includes the voice input/output units 1a~1n such as telephones, the user terminals 2a~2n such as personal computers, the conference server 3, the voice information management unit 4, the network equipment 5 (a PBX, for example) and a LAN 6. The conference server 3 has the conference server controller 3b, the memory 3c and the storage unit 3d. The voice information management unit 4 has the line controller 4a, the voice information management controller 4b, the memory 4c, the information storage unit 4d for recording conference voice information and the voice guidance unit 4e. The line controller 4a is equipped with a switch 4a-1 and an audio mixing circuit 4a-2. The switch 4a-1 of the line controller 4a ordinarily inputs all lines from the network equipment 5 to the mixing circuit 4a-2, and the mixing circuit 4a-2 mixes voice signals which enter from each of the lines and from the output lines of the guidance unit 4e and enters the mixed signals into the information storage unit 4d to record them. Further, upon receiving a request for reproduction of conference audio information from a prescribed telephone, the switch 4a-1 connects only the line of this telephone to a line L2 and transmits a reproduced sound, which has been read out of the information storage unit 4d, to the telephone. The network equipment 5, which has the network unit (switch) 5a, the network controller (main control unit CPU) 5b and the memory 5c, connects the telephone of a conference attendee to the line controller 4a of the voice information management unit 4 via the network unit 5a.

The user terminals 2a~2n, the conference server controller 3b, the voice information management controller 4b and the network controller (CPU) 5b are connected to the LAN 6, and the exchange of data among these units is carried out via the LAN in accordance with the procedures shown in FIGS. 7 through 15.

The telephones 1a~1n and the line controller 4a of the voice information management unit 4 are connected to the network equipment 5, connection/disconnection is controlled in accordance with the procedures of FIGS. 7 through 15, and so is the transmission of audio.

(D) Third Embodiment of the Invention

FIG. 17 is a block diagram showing the configuration of a third embodiment of the present invention, in which components identical with those of the second embodiment are designated by like reference characters. This embodiment differs from the third embodiment in that the audio mixing circuit is moved to the network equipment 5.

This system includes the voice input/output units 1a~1n such as telephones, the user terminals 2a~2n such as personal computers, the conference server 3, the voice information management unit 4, the network equipment 5 (a PBX, for example) and the LAN 6. The conference server 3 has the conference server controller 3b, the memory 3c and the storage unit 3d. The voice information management unit 4 has the line controller 4a, the voice information management controller 4b, the memory 4c, the information storage unit 4d for recording conference voice information and the voice guidance unit 4e. The line controller 4a is constituted by the switch 4a-1. The network equipment 5 has the network unit (switch) 5a, the network controller (main control unit CPU) 5b, the memory 5c and the mixing circuit 5d. The switch 5a inputs the telephones of the conference attendees to the mixing circuit 5d, and the latter mixes audio from the telephones of the conference participants and audio from the guidance unit 4e and enters the mixed audio into the information storage unit 4d via a line L1→switch 4a-1→voice information management controller 4b. The switch 5a of the network equipment 5 ordinarily connects the telephones of all conference attendees to the mixing circuit 5d. However, when reproduction of conference audio information is requested from a prescribed telephone, only the line of this telephone is connected to line L2 and reproduced audio, which has been read out of the information storage unit 4d, is transmitted to this telephone.

In accordance with the present invention as described above, the arrangement is such that if a participant performs a connect/disconnect operation to participate in or withdraw from an electronic conference, a conference server subsequently manages attendance/withdrawal/absence of planned attendees at the electronic conference automatically, thereby making it possible to dispense with an attendance registration operation by the attendee per se when the conference convenes.

Further, in accordance with the invention, it is so arranged that all telephones of planned attendees are called a fixed time prior to conference convening time and voice guidance is sent to these telephones to request attendance at the conference. Further, it is so arranged that the telephones of planned participants who have not yet appeared at the conference upon passage of a fixed time following convening of the conference are called and voice guidance is sent to these telephones to request attendance at the conference. This makes it possible to provide a support service that facilitates smooth attendance at electronic conferences.

Furthermore, in accordance with the present invention, the conference server uses attendee summary information to calculate an aggregate of total attendee hours as well as percentage of attendance or percentage of absence after a conference is concluded. As a result, it is possible to provide a basic-data collecting service for creating statistical information appropriate for raising conference efficiency.

Further, in accordance with the present invention, conference minutes and conference audio information can be referred to and/or reproduced while the conference is in progress or after it is over. This makes it possible even for latecomers, those who withdraw during the conference and absentees to readily ascertain the business transacted at the conference.

Further, in accordance with the present invention, time remaining for the conference is monitored and, when the remaining time reaches a prescribed time, voice guidance informing of the time remaining for the conference is sent to the connected telephones. As a result, it is possible to provide a support service that facilitates electronic conferences.

As many apparently widely different embodiments of the present invention can be made without departing from the spirit and scope thereof, it is to be understood that the invention is not limited to the specific embodiments thereof except as defined in the appended claims.

What is claimed is:

1. An electronic conference system comprising:

a plurality of voice input/output units;

a plurality of user terminals for entering/displaying electronic document information and transmitting/receiving electronic documents:

a conference server for accumulating electronic documents received from said plurality of user terminals, selecting an electronic document, which has been designated by a user terminal, from among the electronic documents accumulated, and transmitting the electronic document selected to the user terminal;

a voice information management unit for accumulating voice information received from said plurality of voice input/output units, selecting prescribed voice information, which is designated by a user terminal, from among the voice information accumulated, and transmitting the voice information selected to said voice input/output units;

network equipment for interconnecting said plurality of voice input/output units, said plurality of user terminals, said conference server and said voice information management unit having a table which indicates user identification information in correspondence with connection addresses of said voice input/output units and user terminals;

wherein when conference participation requests are issued from said user terminals or said input/output units, said network equipment obtains user identification information corresponding to these user terminals or voice input/output units from said table and communicates this information to said conference server;

said conference server collects conference attendee information on the basis of the user identification information communicated and creates an attendee list;

wherein when conference withdrawal requests are issued from said user terminals or said input/output units during the conference, said network equipment obtains user identification information corresponding to these user terminals or voice input/output units from said table and communicates this information to said conference server; and said conference server collects conference withdrawal information on the basis of the user identification information communicated.

2. The system according to claim 1, wherein said conference server automatically inserts attendee information and withdrawee information into an attendee summary field of a minutes format having the attendee summary field and an electronic-document recording field for recording conference proceedings entered from a user terminal.

3. The system according to claim 2, wherein a prescribed user terminal enters a list of planned attendees into said conference server before the conference convenes, and said conference server compares the planned attendees with the attendees, creates a list of absentees and automatically inserts said list of absentees into the attendee summary field of the minutes format.

4. The system according to claim 2, wherein when conference participation requests or withdrawal requests are issued from said user terminals or said input/output units, said network equipment communicates conference participation time and conference withdrawal time to said conference server together with the user identification information, and said conference server inserts these times into the attendee summary field of the minutes format.

5. The system according to claim 4, wherein said conference server uses the attendee summary information to calculate an aggregate of total attendee hours as well as percentage of attendance or percentage of absence after the conference is concluded.

6. The system according to claim 2, wherein a prescribed user terminal enters a list of planned attendees into said conference server before the conference convenes, and said conference server communicates the list of planned attendees to said network equipment before a fixed time prior to conference convening time;

said network equipment automatically calls the voice input/output units of the planned attendees and, after said voice input/output units answers, connects said voice information management unit and said voice input/output units; and said voice information management unit transmits voice guidance, which requests attendance at the conference, to said voice input/output units.

7. The system according to claim 2, wherein said conference server creates conference proceedings, which have been entered from a user terminal, as an electronic document and, when a request for perusal of the conference proceedings during the conference is made from a prescribed user terminal, transmits said conference proceedings to the user terminal via said network equipment and displays said conference proceedings on a display of the user terminal.

8. The system according to claim 2, wherein said voice information management unit accumulates the voices of users entered from each of said voice input/output units during the conference and, when a request for reproduction of conference voice information is made from a prescribed user terminal or voice input/output unit, transmits said conference voice information to a designated voice input/output unit via said network equipment.

9. The system according to claim 2, wherein after the conference ends, said conference server saves conference minutes in a memory device, responds to a request from a user terminal by transmitting said minutes to the user terminal via said network equipment and displaying said minutes on a display of the user terminal.

10. The system according to claim 2, wherein after the conference ends, said voice information management unit saves conference voice information and, when there is a request for reproduction of the conference voice information from a prescribed user terminal or voice input/output unit, transmits said conference voice information to a designated voice input/output unit via said network equipment.

11. An electronic conference system comprising:

a plurality of voice input/output units;

a plurality of user terminals for entering/displaying electronic document information and transmitting/receiving electronic documents;

a conference server for accumulating electronic documents received from said plurality of user terminals, selecting an electronic document, which has been designated by a user terminal, from among the electronic documents accumulated, and transmitting the electronic document selected to the user terminal;

a voice information management unit for accumulating voice information received from said plurality of voice input/output units, selecting prescribed voice information, which is designated by a user terminal, from among the voice information accumulated, and transmitting the voice information selected to said voice input/output units;

network equipment for interconnecting said plurality of voice input/output units, said plurality of user terminals, said conference server and said voice information management unit having a table which indicates user identification information in correspondence with connection addresses of said voice input/output units and user terminals;

wherein when conference participation requests are issued from said user terminals or said input/output units, said network equipment obtains user identification information corresponding to these user terminals or voice input/output units from said table and communicates this information to said conference server;

said conference server collects conference attendee information on the basis of the user identification information communicated and creates an attendee list;

wherein a prescribed user terminal enters conference conclusion time into said conference server before the conference convenes;

said conference server monitors remaining conference time and, when the remaining conference time attains a prescribed time, connects said voice information management unit to voice input/output units of all attendees via said network equipment; and said voice information management unit sends voice guidance informing of remaining conference time to all voice input/output units.

* * * * *